United States Patent [19]

Röckrath et al.

[11] Patent Number: 5,516,559
[45] Date of Patent: May 14, 1996

[54] PROCESS FOR THE PRODUCTION OF A TWO-COAT FINISH, AND NONAQUEOUS COATINGS SUITABLE FOR THIS PROCESS

[75] Inventors: Ulrike Röckrath, Marl; Georg Wigger; Ulrich Poth, both of Münster, all of Germany

[73] Assignee: BASF Lacke+Farben, AG, Muenster-Hiltrup, Germany

[21] Appl. No.: 256,975

[22] PCT Filed: Feb. 3, 1993

[86] PCT No.: PCT/EP93/00242

§ 371 Date: Aug. 23, 1994

§ 102(e) Date: Aug. 23, 1994

[87] PCT Pub. No.: WO93/15849

PCT Pub. Date: Aug. 19, 1993

[30] Foreign Application Priority Data

Feb. 15, 1992 [DE] Germany .......................... 42 04 518.5

[51] Int. Cl.⁶ .................. B05D 1/36; B05D 7/00
[52] U.S. Cl. .................. 427/407.1; 427/409; 525/454; 525/456
[58] Field of Search .................. 427/388.2, 407.1, 427/409, 412.1; 525/454, 456; 204/181.1

[56] References Cited

U.S. PATENT DOCUMENTS 3,639,147  2/1972  Benefiel et al. .................. 117/73
5,281,443  1/1994  Briggs et al. .................. 427/407.1

FOREIGN PATENT DOCUMENTS 0038127    3/1981  European Pat. Off. .
0403044A2  1/1990  European Pat. Off. .
2639491    9/1976  Germany .
2242867    9/1990  Japan .

Primary Examiner—Michael Lusignan
Attorney, Agent, or Firm—Anne Gerry Sabourin

[57] ABSTRACT

The invention relates to a process for the production of two-coat finishes of the basecoat/clearcoat type, in which nonaqueous transparent topcoats are employed, which comprise (A) a synthetic resin containing hydroxyl groups or a mixture of synthetic resins containing hydroxyl groups,
(B) an amino resin or a mixture of amino resins, and
(C) a blocked polyisocyanate or a mixture of blocked polyisocyanates, in which component (C) comprises isocyanate groups blocked both with a blocking agent (I) and with a blocking agent (II), and the blocking agent (I) being a dialkyl malonate, the blocking agent (II) being a blocking agent which is different from (I) and contains active methylene groups or an oxime, and the ratio of equivalents between the isocyanate groups blocked with (I) and the isocyanate groups blocked with (II) being between 1.0:1.0 and 9.0:1.0.

19 Claims, No Drawings

PROCESS FOR THE PRODUCTION OF A TWO-COAT FINISH, AND NONAQUEOUS COATINGS SUITABLE FOR THIS PROCESS

The invention relates to a process for the production of a two-coat finish, in which (1) a pigmented basecoat is applied to the substrate surface,
(2) a polymer film is formed from the basecoat applied in step (1),
(3) a nonaqueous transparent topcoat is applied to the resulting basecoat layer, and subsequently
(4) basecoat layer and topcoat layer are baked together.

The invention also relates to nonaqueous coatings suitable for this process.

The basecoat/clearcoat process described above is known and is employed in particular for producing finishes, in particular metallic finishes on car bodies (c.f. e.g. U.S. Pat. No. 3,639,147 and EP-A-38 127).

Finishes which can be prepared using the basecoat/clearcoat process, in comparison to single-coat finishes, give an improved effect and enable the production of finishes with bright, purer colors.

The basecoat initially applied in step (1) determines, depending on the type, amount and spatial orientation of the pigments employed, the color and, if appropriate, the effect (e.g. metallic effect or pearlescent effect) of the finish.

In step (2) of the process, at least part of the organic solvents and/or at least part of the water is removed in a flash-off phase from the basecoat film applied in step (1). In step (3) a nonaqueous transparent topcoat is applied to this predried but unbaked basecoat layer (wet-on-wet method) and then in step (4) the basecoat layer and topcoat layer are baked together.

The transparent topcoat applied in step (3) gives the two-coat finish gloss and fullness, and protects the pigmented paint layer applied in step (1) against chemical and physical attack.

High-quality two-coat finishes can only be obtained by the process under discussion if the transparent topcoat applied in step (3) does not interfere with the basecoat layer applied in steps (1) and (2) in such a way that the optical effect is impaired (e.g. clouding). On the other hand, the transparent topcoat must have a composition such that after the baking process carried out in step (4) it adheres well to the basecoat layer. Further important characteristics which the transparent topcoat layer obtained after the baking process must have are high transparency, high gloss and good mechanical properties, such as hardness, scratch resistance and elasticity. The transparent topcoat layer obtained after the baking process must have not least a high degree of resistance to climatic effects (e.g. temperature fluctuations, moisture in the form of water vapor, rain, dew, radiation stress etc) and to attack by acids or other chemicals, such as organic solvents. In addition, the transparent topcoats applied in step (3) should have as low a content of organic solvents as possible and good stability on storage.

JP-A-2-242,867 describes a basecoat/clearcoat process in which, in step (3), nonaqueous transparent topcoats are applied, which comprise (A) a synthetic resin containing hydroxyl groups, (B) an amino resin and (C) a blocked polyisocyanate, where components (B) and (C) are to be chosen such that the temperature at which a chemical reaction occurs between (A) and (C) should be not more than 20° C. below and not more than 50° C. above the temperature at which a chemical reaction between (A) and (B) starts.

Blocking agents which are mentioned for the preparation of component (C) are: volatile, low molecular weight compounds containing active hydrogen atoms, such as methanol, ethanol, propanol, butanol, hexanol, cyclohexanol, benzyl alcohol, ethylene glycol monoethyl ether and other aliphatic or aromatic monoalcohols, dimethyl- or diethyl-aminoethanol and other tertiary amines containing hydroxyl groups, acetone oxime, methyl ethyl ketone oxime and other oximes, acetylacetone, acetoacetates, malonates and other compounds containing active methylene groups, ε-caprolactam and other lactams, and phenol. The blocking agents preferably employed are aliphatic monoalcohols, oximes and caprolactams.

The transparent topcoats described in JP-A-2-242,867 give finishes which require improvement, in particular with regard to their resistance to organic solvents and acids, their gloss, transparency and resistance to yellowing.

DE-B-2,639,491 describes nonaqueous coatings which comprise a polyester resin and/or alkyd resin containing hydroxyl groups, hexamethylene diisocyanate blocked with an alkyl acetoacetate and/or 2,2,4-trimethylhexamethylene diisocyanate blocked with an alkyl acetoacetate, and an amino resin. These coatings can also be employed as transparent topcoats in the automotive finishing sector. Finishes obtained using these coatings undergo yellowing, especially when using high baking temperatures and/or prolonged baking times, and require improvement, in particular with regard to their resistance to acids and organic solvents and to their scratch resistance.

The subject of the present invention is a process of the type mentioned at the beginning in which, in step (3), a nonaqueous transparent topcoat is applied, which comprises (A) a synthetic resin containing hydroxyl groups or a mixture of synthetic resins containing hydroxyl groups,
(B) an amino resin or a mixture of amino resins, and
(C) a blocked polyisocyanate or a mixture of blocked polyisocyanates, in which component (C) contains isocyanate groups blocked both with a blocking agent (I) and with a blocking agent (II), the blocking agent (I) being a dialkyl malonate or a mixture of dialkyl malonates, the blocking agent (II) being a blocking agent which is different from (I) and contains active methylene groups, an oxime or a mixture of these blocking agents, and the ratio of equivalents between the isocyanate groups blocked with (I) and the isocyanate groups blocked with (II) being between 1.0:1.0 and 9.0:1.0.

The two-coat finishes produced by the process according to the invention are notable for a high level of hardness, high gloss, good adhesion between the basecoat layer and topcoat layer, good topcoat appearance, good scratch resistance and good resistance to climatic effects, organic solvents and acids, and a high resistance to yellowing (in particular to yellowing resulting from high baking temperatures and/or long baking times). These favorable properties are retained even if different basecoats are used. The transparent topcoats employed according to the invention are also notable for high stability on storage and can also be processed well with a low content (e.g. less than 50% by weight) of organic solvents.

EP-A-403,044 describes coatings containing blocked polyisocyanates, in which each polyisocyanate molecule is blocked with at least two different blocking agents and at least two of the blocking agents have a considerable difference, preferably at least 40° C., in their deblocking temperatures. The coatings described in EP-A-403,044 do not contain an amino resin and are employed for coil-coating applications. EP-A-403,044 contains no mention of the basecoat/clearcoat process on which the present invention is based.

In step (I) of the process according to the invention, it is in principle possible to employ all pigmented basecoats suitable for the preparation of two-coat finishes. Such basecoats are well known to those skilled in the art. It is possible to employ both water-thinnable basecoats and basecoats based on organic solvents. Suitable basecoats are described in, for example, U.S. Pat. No. 3,639,147, DE-A-3,333,072, DE-A-3,814,853, GB-A-2,012,191, U.S. Pat. No. 3,953,644, EP-A-260,447, DE-A-3,903,804, EP-A-320, 552, DE-A-3,628,124, U.S. Pat. No. 4,719,132, EP-A-297, 576, EP-A-69,936, EP-A-89,497, EP-A-195,931, EP-A-228,003, EP-A-38,127 and DE-A-2,818,100. These patent documents also contain further information on the basecoat/clearcoat process under discussion.

In step (2) of the process according to the invention the solvents and/or the water are removed in a flash-off phase from the basecoat applied in step (1). The basecoat layer can also be baked. However, this is disadvantageous on economic grounds because then two baking operations instead of one are required to produce the two-coat finish.

The nonaqueous transparent topcoat employed in step (3) of the process according to the invention comprises
(A) a synthetic resin containing hydroxyl groups or a mixture of synthetic resins containing hydroxyl groups,
(B) an amino resin or a mixture of amino resins, and
(C) a blocked polyisocyanate or a mixture of blocked polyisocyanates,
in which component (C) is blocked both with a blocking agent (I) and with a blocking agent (II),
the blocking agent (I) being a dialkyl malonate or a mixture of dialkyl malonates,
the blocking agent (II) being a blocking agent which is different from (I) and contains active methylene groups, an oxime or a mixture of these blocking agents, and
the ratio of equivalents between the isocyanate groups blocked with (I) and the isocyanate groups blocked with (II) being between 1.0:1.0 and 9.0:1.0.

The component (A) employed can in principle be any synthetic resin containing hydroxyl groups which is suitable for transparent topcoats, or a mixture of such synthetic resins. As component (A) it is preferred to employ polyester resins containing hydroxyl groups and/or alkyd resins containing hydroxyl groups and/or polyacrylate resins containing hydroxyl groups, or mixtures of these resins. The synthetic resins employed as component (A) in general have hydroxyl numbers of from 40 to 240, preferably 60 to 150, and number-average molecular weights of from 1500 to 30,000, preferably 2000 to 15,000, and particularly preferably 2500 to 7500.

Polyester resins, alkyd resins and polyacrylate resins containing hydroxyl groups are well known. Examples of such resins and their preparation are described in, for example, JP-A-2-242,867, DE-B-2,639,491 and in the patent documents mentioned on page 6 in lines 20 to 25.

As component (A) it is particularly preferred to employ polyacrylate resins which can be prepared by polymerizing
(a) from 10 to 92, preferably 20 to 60, % by weight of an alkyl or cycloalkyl acrylate or of an alkyl or cycloalkyl methacrylate having 1 to 18, preferably 4 to 13, carbon atoms in the alkyl or cycloalkyl moiety, or mixtures of such monomers,
(b) from 8 to 60, preferably 12.5 to 38.5, % by weight of a hydroxyalkyl acrylate or of a hydroxyalkyl methacrylate having 2 to 4 carbon atoms in the hydroxyalkyl moiety, or mixtures of such monomers,
(c) from 0.0 to 5.0, preferably 0.7 to 3.0, % by weight of acrylic acid or methacrylic acid, or mixtures of these monomers, and
(d) from 0 to 50, preferably 0 to 30, % by weight of ethylenically unsaturated monomers which are different from (a), (b) and (c) and can be copolymerized with (a), (b) and (c), or mixtures of such monomers
to give polyacrylate resins having hydroxyl numbers of from 40 to 240, preferably 60 to 150, acid values of from 0 to 35, preferably from 5 to 20, glass transition temperatures of from −35° to +70° C., preferably from −20° to +40° C., and number-average molecular weights of from 1500 to 30,000, preferably from 2000 to 15,000 (determined by gel permeation chromatography using a polystyrene standard).

Examples of (a)-components are: methyl, ethyl, propyl, n-butyl, isobutyl, tert-butyl, pentyl, hexyl, heptyl and 2-ethylhexyl acrylate and methacrylate, and cyclohexyl acrylate and cyclohexyl methacrylate.

Examples of (b)-components are: hydroxyethyl, hydroxypropyl and hydroxybutyl acrylate and methacrylate.

Examples of (d)-components are: aromatic vinyl compounds, for example styrene, vinyltoluene, α-methylstyrene, α-ethylstyrene, ring-substituted diethylstyrene, isopropylstyrene, butylstyrenes and methoxystyrenes; vinyl ethers, for example ethyl vinyl ether, n-propyl vinyl ether, isopropyl vinyl ether, n-butyl vinyl ether and isobutyl vinyl ether, and vinyl esters, for example vinyl acetate, vinyl propionate, vinyl butyrate, vinyl pivalate and the vinyl ester of 2-methyl-2-ethylheptanoic acid.

The hydroxyl number and the acid value of the polyacrylate resins can easily be controlled by those skilled in the art via the amount of component (b) and (c) employed.

The glass transition temperature of the polyacrylate resins is determined by the type and amount of the monomers employed. The monomers can be selected by those skilled in the art with the aid of the following formula, which can be used to calculate approximately the glass transition temperatures of polyacrylate resins:

$$\frac{1}{T_G} = \sum_{n=1}^{n=x} \frac{W_n}{T_{Gn}}$$

$T_G$=glass transition temperature of the polyacrylate resin
x=number of different monomers copolymerized in the polyacrylate resin.
$W_n$=proportion by weight of the nth monomer
$T_{Gn}$=glass transition temperature of the homopolymer of the nth monomer.

Measures to control the molecular weight (e.g. the selection of appropriate polymerization initiators, the use of chain transfer agents etc.) are part of the expert knowledge of those of average skill in the art, and require no more detailed discussion here.

As component (A), it is also particularly preferred to employ polyester resins or alkyd resins which can be prepared by reacting
(α) a cycloaliphatic or aliphatic polycarboxylic acid or a mixture of such polycarboxylic acids,
(β) an aliphatic or cycloaliphatic polyol having more than two hydroxyl groups in the molecule, or a mixture of such polyols,
(γ) an aliphatic or cycloaliphatic diol or a mixture of such diols, and
(δ) an aliphatic, linear or branched, saturated monocarboxylic acid or a mixture of such monocarboxylic acids in a molar ratio of (α):(β):(γ):(δ)=1.0:0.2–1.3:0.0–1.1:0.0–1.4, preferably 1.0:0.5– 1.2:0.0–0.6:0.2–0.9 to give a polyester resin or alkyd resin.

Examples of component (α) are: hexahydrophthalic acid, 1,4-cyclohexanedicarboxylic acid, endomethylenetetrahydrophthalic acid, oxalic acid, malonic acid, succinic acid, glutaric acid, adipic acid, pimelic acid, suberic acid, azelaic acid and sebacic acid.

Examples of component (β) are: pentaerythritol, trimethylolpropane, trimethylolethane and glycerol.

Examples of component (γ) are: ethylene glycol, diethylene glycol, propylene glycol, neopentyl glycol, 2-methyl-2-propylpropane-1,3-diol, 2-ethyl-2-butyl-propane- 1,3-diol, 2,2,4-trimethylpentane-1,5-diol, 2,2,5-trimethylhexane-1,6-diol, neopentyl glycol hydroxypivalate and dimethylolcyclohexane.

Examples of component (δ) are: 2-ethylhexanoic acid, lauric acid, isooctanoic acid, isononanoic acid and mixtures of monocarboxylic acids which are obtained from coconut oil or palm kernel oil.

The preparation of polyester resins and/or alkyd resins carrying hydroxyl groups is described in, for example, Ullmanns Encyklopädie der technischen Chemie, third edition, volume 14, Urban & Schwarzenberg, Munich, Berlin 1863, pages 80 to 89 and pages 99 to 105, and in the books: Résines Alkydes-Polyesters by J. Bourry, Paris Verlag Dunod 1952, Alkyd resins by C. R. Martens, Reinhold Publishing Corporation, New York 1961 and Alkyd Resin Technology by T. C. Patton, Interscience Publishers 1962.

As component (B), in principle any amino resin suitable for transparent topcoats, or a mixture of such amino resins, can be employed.

Such resins are well known to those skilled in the art and are marketed by numerous companies as commercial products. Amino resins are condensation products of aldehydes, especially formaldehyde, and, for example, urea, melamine, guanamine and benzoguanamine. The amino resins contain alcohol groups, preferably methylol groups, of which some, or preferably all, are etherified with alcohols.

As component (B), it is preferred to employ melamine-formaldehyde resins etherified with lower alcohols, in particular with methanol or butanol. It is particularly preferred to employ melamine-formaldehyde resins etherified with lower alcohols, in particular with methanol and/or butanol, which on statistical average still contain 0.1 to 0.25 hydrogen atoms attached to nitrogen atoms per triazine ring, as component (B).

The transparent topcoats employed according to the invention contain as component (C) a blocked polyisocyanate or a mixture of blocked polyisocyanates in which component (C) contains isocyanate groups blocked both with a blocking agent (I) and with a blocking agent (II), the blocking agent (I) being a dialkyl malonate or a mixture of dialkyl malonates, the blocking agent (II) being a blocking agent which is different from (I) and contains active methylene groups, an oxime or a mixture of these blocking agents, and the ratio of equivalents between the isocyanate groups blocked with (I) and the isocyanate groups blocked with (II) being between 1.0:1.0 and 9.0:1.0, preferably between 8.0:2.0 and 6.0:4.0, particularly preferably between 7.5:2.5 and 6.5:3.5.

Component (C) is preferably prepared as follows. A polyisocyanate or a mixture of polyisocyanates is reacted in a manner known per se with a mixture of the blocking agents (I) and (II), the mixture of the blocking agents (I) and (II) containing the blocking agents (I) and (II) in a molar ratio which is between 1.0:1.0 and 9.0:1.0, preferably between 8.0:2.0 and 6.0:4.0, particularly preferably between 7.5:2.5 and 6.5:3.5. The polyisocyanate or the mixture of polyisocyanates can be reacted with the mixture of the blocking agents (I) and (II) to the point where no more isocyanate groups can be detected. In practice this may require the use of very large excess amounts of blocking agents and/or very long reaction times. It has now been found that, surprisingly, coatings with the good properties described above are also obtained if at least 50 percent, preferably at least 70 percent, of the isocyanate groups of the polyisocyanate or of the mixture of polyisocyanates are reacted with the mixture of the blocking agents (I) and (II), and the remaining isocyanate groups are reacted with a compound containing hydroxyl groups or with a mixture of compounds containing hydroxyl groups. The compounds containing hydroxyl groups which are employed are preferably low molecular weight aliphatic or cycloaliphatic polyols such as neopentyl glycol, dimethylolcyclohexane, ethylene glycol, diethylene glycol, propylene glycol, 2-methyl-2-propylpropane-1,3-diol, 2-ethyl-2-butylpropane-1,3-diol, 2,2,4-trimethylpentane- 1,5-diol and 2,2,5-trimethylhexane-1,6-diol, or the synthetic resins containing hydroxyl groups which can be employed as component (A).

Component (C) can also be obtained by mixing polyisocyanates blocked with the blocking agents [sic] (I) or (II) in a ratio such that a mixture is obtained in which the ratio of equivalents between the isocyanate groups blocked with (I) and the isocyanate groups blocked with (II) is between 1.0:1.0 and 9.0:1.0, preferably between 8.0:2.0 and 6.0:4.0, particularly preferably between 7.5:2.5 and 6.5:3.5. This procedure for preparing component (C) is less preferred.

It is in principle possible to employ all polyisocyanates which can be employed in the coating sector for the preparation of component (C). However, it is preferred to employ polyisocyanates whose isocyanate groups are attached to aliphatic or cycloaliphatic radicals. Examples of such polyisocyanates are hexamethylene diisocyanate, isophorone diisocyanate, trimethylhexamethylene diisocyanate, dicyclohexylmethane diisocyanate and 1,3-bis(2-isocyanato-2-propyl)benzene (TMXDI) and adducts of these polyisocyanates with polyols, in particular low molecular weight polyols, for example trimethylolpropane, and polyisocyanates which are derived from these polyisocyanates and contain isocyanurate groups and/or biuret groups. As polyisocyanates it is particularly preferred to employ hexamethylene diisocyanate and isophorone diisocyanate, polyisocyanates which are derived from these diisocyanates, contain isocyanurate or biuret groups and which preferably contain more than two isocyanate groups per molecule, and reaction products of hexamethylene diisocyanate and isophorone diisocyanate, or a mixture of hexamethylene diisocyanate and isophorone diisocyanate, containing 0.3–0.5 equivalents of a low molecular weight polyol having a molecular weight of from 62 to 500, preferably from 104 to 204, in particular a triol, for example trimethylolpropane.

As blocking agent (I), dialkyl malonates or a mixture of dialkyl malonates are employed.

Examples of dialkyl malonates which can be employed are dialkyl malonates having 1 to 6 carbon atoms in each of the alkyl radicals, for example dimethyl malonate and diethyl malonate, with diethyl malonate being preferably employed.

As blocking agents (II), blocking agents which are different from (I) and contain active methylene groups, and oximes and mixtures of these blocking agents are employed.

Examples of blocking agents which can be employed as blocking agent (II) are: methyl, ethyl, propyl, butyl, pentyl, hexyl, heptyl, octyl, nonyl, decyl or dodecyl acetoacetate, acetone oxime, methyl ethyl ketoxime, acetylacetone, formaldoxime, acetaldoxime, benzophenoxime [sic], acetoxime and diisobutyl ketoxime. As blocking agent (II) it is preferred to employ an alkyl acetoacetate having 1 to 6 carbon atoms in the alkyl moiety or a mixture of such alkyl acetoacetates or a ketoxime or a mixture of ketoximes. Ethyl acetoacetate or methyl ethyl ketoxime is particularly preferably employed as blocking agent (II).

Components (A), (B) and (C) are generally employed in the transparent topcoats employed according to the invention in amounts such that component (A) is present in an amount of from 50 to 90, preferably 60 to 75, % by weight, component (B) in an amount of from 5 to 45, preferably 10 to 25, % by weight and component (C) in an amount of from 5 to 45, preferably 10 to 25, % by weight, the percentages by weight being based on (A)+(B)+(C)=100% by weight.

The transparent topcoats employed according to the invention contain no pigments or only transparent pigments. As organic solvents, the topcoats contain customary organic solvents conventionally used in the production of coatings. In addition, the topcoats can also contain further customary additives, for example light stabilizers, leveling assistants etc.

The two-coat finishes produced with the topcoats employed according to the invention have the advantageous characteristics in particular even when they have been baked under the baking conditions currently employed in automotive production-line finishing (30 minutes at 130° C. or 20 minutes at 140° C.).

The invention is illustrated in more detail in the following examples. Amounts and percentages are to be understood as being by weight, unless expressly stated otherwise.

PREPARATION OF COMPONENT (A)

EXAMPLE 1

Preparation of a Polyacrylate Resin Containing Hydroxyl Groups (Acrylate Resin 1)

1140 g of polymerization solvent comprising a fraction of aromatic hydrocarbons having a boiling range from 158° C. to 172° C. at atmospheric pressure are weighed out and charged to a jacketed stainless steel laboratory reactor with a useful capacity of 4 l, and with a bottom valve, equipped with a heating system which can be controlled by an oil circulation thermostat, a paddle stirrer with stirrer seal, driven by an electric motor having a power consumption of 230 W, a thermometer for monitoring the temperature of the reaction mixture, an inlet pipe for a stream of protective nitrogen gas, one metering vessel each for a monomer mixture and an initiator solution, and a reflux condenser. The solvent is heated to 150° C. Then, simultaneously, a mixture of 562 g of tert-butyl acrylate, 182 g of n-butyl methacrylate, 364 g of 2-hydroxypropyl methacrylate, 73 g of 4-hydroxybutyl acrylate and 33 g of acrylic acid is metered in from the metering vessel for the monomer mixture, and a solution of 73 g of tert-butyl perbenzoate in 73 g of the aromatic solvent described above is metered in from the metering vessel for the initiator solution. The monomer mixture and the initiator solution are metered evenly into the reactor over a period of 4 hours and over a period of 4.5 hours respectively. The temperature is held at 150° C. during this time. When the addition of the initiator is complete, the reaction mixture is held at 150° C. for a further hour and then the degree of conversion is determined by multiple determination of the nonvolatile fraction of the reaction mixture (15 min in a circulating-air oven at 180° C.). When conversion is complete, 526 g of the polymerization solvent are distilled off under vacuum at 150 to 190 hPa and 110° C. The batch is then diluted with 101 g of 1-methoxypropyl 2-acetate and adjusted with the abovementioned aromatic solvent to a nonvolatile fraction of approximately 60% by weight. The resulting polymer solution has a nonvolatile fraction (measured in a circulating-air oven; 60 min at 130° C.) of 59.5%. The polymer has an acid value of 23.6 and an OH-number of 139, and a solution viscosity of 390 mPa.s, as measured in the solution described in an ICI plate-cone viscometer at 23° C.

EXAMPLE 2

Preparation of a Polyacrylate Resin Containing Hydroxyl Groups (Acrylate Resin 2)

The procedure is as in Example 1. 1033 g of the aromatic solvent described in Example 1 are weighed out and charged to the apparatus described in that example, and heated to 140° C. A mixture of 131 g of a commercially available mixture of esters comprising the isomers of tridecyl alcohol with methacrylic acid, 269 g of n-butyl acrylate, 197 g of n-butyl methacrylate, 393 g of styrene, 131 g of 2-hydroxyethyl methacrylate, 157 g of 2-hydroxypropyl methacrylate and 33 g of acrylic acid is weighed out and transferred to the metering vessel for the monomers. A solution of 79 g of di-tert-butyl peroxide in 79 g of the aromatic solvent mentioned is weighed out and transferred to the metering vessel for the initiator solution. The contents of the metering vessel for monomers and the contents of the metering vessel for the initiator solution are metered uniformly into the polymerization solvent over 4 hours and 4.75 hours respectively. The metering of the initiator solution is started 15 minutes before the metering of the monomer mixture. The temperature is held at 140° C. during this time. When the addition of the initiator is complete, the reaction mixture is held at 140° C. for a further hour, and then the degree of conversion is determined by multiple determination of the nonvolatile fraction of the reaction mixture (15 min in a circulating-air oven at 180° C.). When conversion is complete, the batch is cooled and adjusted to a nonvolatile fraction of approximately 55% with the aromatic solvent described. The resulting polymer solution has a nonvolatile fraction (measured in a circulating-air oven; 60 min at 130° C.) of 55.4%. The polymer has an acid value of 22.8 and an OH-number of 89, and a solution viscosity of 660 mPa.s, as measured in the solution described in an ICI plate-cone viscometer at 23° C.

EXAMPLE 3

Preparation of an Alkyd Resin Containing Hydroxyl Groups 1142 g of hexahydrophthalic anhydride, 1024 g of 1,1,1-trimethylolpropane, 527 g of isononanoic acid, as an isomer mixture of 3,3,5-trimethylhexanoic acid and 3,5,5 trimethylhexanoic acid, and 100 g of xylene as an entrainer are weighed out and charged to the apparatus described in Example 1, but with the metering vessels and reflux condenser replaced by a water separator and reflux condenser. The water separator is filled with xylene. The contents of the apparatus are heated over 8 hours to 210° C. so that there is a steady reflux of the entraining agent. The reaction mixture is held at 210° C. until an acid value of 18.6 and a viscosity of 940 mPa.s, measured on a sample of a 60% solution of the reaction mixture in the aromatic solvent described in Example 1, are reached. The contents of the apparatus are then cooled to 160° C. and dissolved with stirring in 1000 g of the abovementioned aromatic solvent, and the solution is then run off from the apparatus. The solution is then diluted with a quantity of the aromatic solvent such that a nonvolatile fraction of 60.5% (measured in a circulating-air oven; 60 min at 130° C.) results. The alkyd resin prepared in this way has an acid value of 17.1, an OH-number of 123 based on the nonvolatile fraction and a viscosity of 1200 mPa.s in the solution described, as measured in an ICI plate-cone viscometer at 23° C.

PREPARATION OF COMPONENT (C)

EXAMPLE 4

Blocked Polyisocyanate 1 (Component (C))

504.0 g of a commercially available isocyanurate trimer of hexamethylene diisocyanate and 257.2 g of the aromatic solvent described in Example 1 are weighed out and charged to the apparatus described in Example 1 equipped with a metering vessel and a reflux condenser. The solution is heated to 50° C. A mixture of 348.0 g of diethyl malonate, 104.0 g of ethyl acetoacetate and 2.5 g of a 50% solution of sodium p-dodecylphenolate in xylene is then metered from the metering vessel into the solution over a period of 2 hours, such that the temperature does not exceed 70° C.

The mixture is then heated slowly to 90° C., and this temperature is maintained for 6 hours. A further 2.5 g of sodium p-dodecylphenolate solution are then added and the mixture held at 90° C. until the content of NCO groups in the reaction mixture has reached 0.48%. 35.1 g of n-butanol are then added. The resulting solution has a nonvolatile fraction of 59.6% (measured in a circulating-air oven; 60 min at 130° C.) and a viscosity of 590 mPa.s, as measured in an ICI plate-cone viscometer at 23° C.

EXAMPLE 5

Blocked Polyisocyanate 2 (Component (C))

The procedure is as in Example 4. 722.0 g of a commercially available isocyanurate trimer of hexamethylene diisocyanate and 460.0 g of the aromatic solvent described in Example 1 are weighed out and charged to the apparatus. A mixture of 527.0 g of diethyl malonate, 130.4 g of ethyl acetoacetate and 4.5 g of a 50% solution of sodium p-dodecylphenolate in xylene is weighed out and transferred to the metering vessel, and metered in and reacted as described. A temperature of 90° C. is maintained until the content of NCO groups in the reaction mixture has reached 0.92%. 20.3 g of 1,4-dimethylolcyclonexane are then added, and the mixture continues to be held at 90° C. until the content of NCO groups in the reaction mixture has reached 0.28%. The batch is then cooled and 140 g of n-butanol are added. The resulting solution has a nonvolatile fraction of 56.8% (measured in a circulating-air oven; 60 min at 130° C.) and a viscosity of 405 mPa.s, as measured in an ICI plate-cone viscometer at 23° C.

PRODUCTION OF TRANSPARENT TOPCOATS ACCORDING TO THE INVENTION

The transparent topcoats are produced by weighing out components (A), (B) and (C) in the order given in Table 1 and mixing them thoroughly by stirring with a laboratory turbine mixer, then adding butyl glycol or the initial quantity of xylene and likewise stirring it in thoroughly. The UV absorber and the free-radical scavenger are premixed separately with (the second quantity of) xylene until they are completely dissolved, then they are added to the first portion of the formulation and likewise stirred in thoroughly. n-Butanol and the leveling agent are then added and mixed in thoroughly. If appropriate, the resulting coatings are adjusted for application with xylene to a viscosity of 23 sec, measured in the DIN 4 cup at 20° C.

TABLE 1

| Example | 6 | 7 | 8 |
| --- | --- | --- | --- |
| Acrylate resin 1 | — | 53.8 | — |
| Acrylate resin 2 | 72.7 | — | — |
| Alkyd resin as in Example 3 | — | — | 66.7 |
| Melamine resin[1] | 14.1 | 11.5 | 14.1 |
| Blocked polyisocyanate 1 | 6.8 | — | — |
| Blocked polyisocyanate 2 | — | 13.2 | 6.8 |
| Butylglycol | 4.7 | — | 2.7 |
| Xylene | — | 8.0 | — |
| UV absorber[2] | 1.1 | 1.7 | 1.1 |
| Free-radical scavenger[3] | 1.1 | 1.5 | 1.1 |
| Xylene | 3.0 | 5.3 | 3.5 |
| n-Butanol | 4.0 | 5.0 | 2.0 |
| Leveling agent[4] | 2.0 | 2.0 | 2.0 |
| | Weighed amounts in g | | |

[1] Commercial melamine resin, highly etherified with n-butanol, with residual imino [sic] groups
[2] Commercial UV absorber based on a substituted benzotriazole
[3] Commercial free-radical scavenger based on a 1,4,6-substituted piperidine
[4] 5% solution of a polythether-substituted polydimethylsiloxane in xylene

PRODUCTION OF TWO-COAT FINISHES OF THE BASECOAT/CLEARCOAT TYPE

EXAMPLE 9

Steel panels coated with a commercially available, cationically deposited electrodeposition coating and a commercially available solvent-containing filler based on polyester and melamine resin are sprayed with a commercially available aqueous basecoat as described in EP-A-089,497 in two passes with a flash-off period of 1 minute in between so as to give a dry film thickness of 14 μm. The panels are then given a flash-off treatment for 10 minutes at room temperature and 5 minutes at 80° C. and then the coating of Example 6 according to the invention is applied in two spray passes so as to give a dry film thickness of 43 μm. The panel is then given a flash-off treatment for 5 minutes at room temperature and then baked for 20 minutes at 140° C.

EXAMPLE 10

The procedure is as in Example 9. After the application of the basecoat the coating of Example 7 according to the invention is applied in two spray passes so as to give a dry film thickness of 45 μm. The panel is given a flash-off treatment for 5 minutes at room temperature and then baked for 20 minutes at 140° C.

EXAMPLE 11

The procedure is as in Example 9. After the application of the basecoat the coating of Example 8 according to the invention is applied in two spray passes so as to give a dry film thickness of 44 μm. The panel is given a flash-off treatment for 5 minutes at room temperature and then baked for 20 minutes at 140° C.

TESTING OF THE TWO-COAT FINISHES

The test results can be taken from Table 2.

TABLE 2

| Finish of Example | 9 | 10 | 11 |
|---|---|---|---|
| Hardness | | | |
| Fisher-scope (N/mm$^2$) | — | 142 | — |
| Pendulum attenuation (Konig) | 110 | — | 113 |
| Gloss (Gardner, 20°) | 88 | 85 | 87 |
| Acid resistance | | | |
| 2$^h$ 36% sulfuric acid* | — | 0 | — |
| 4$^h$ 36% sulfuric acid* | — | 1 | — |
| 6$^h$ 36% sulfuric acid* | — | 1 | — |
| Gradient oven, 1% sulfuric acid** | 44/51 ? 0 | — | 44/47 ? 1 |
| Cross-hatching (cross hatch 1)* | 0 | 0–1 | 0 |
| Color comparison after constant climatic test (240$^h$)* | 0–1 | 0–1 | 0 |
| Yellowing (30 min, 160° C.)* | 0 | 0 | 0–1 |

*Grading: 0 to 5, 0 = no damage, 5 = heavy damage
**Test according to LPV 5500 of Mercedes Benz Werke

We claim:
1. Process for the production of a two-coat finish, comprising the steps of:
   (1) applying a pigmented basecoat to a substrate surface,
   (2) forming a polymer film from the basecoat applied in step (1),
   (3) applying a nonaqueous transparent topcoat to the resulting basecoat layer, which topcoat comprises
      (A) resins selected from the group consisting of synthetic resins containing hydroxyl groups and mixtures thereof,
      (B) resins selected from the group consisting of amino resins and mixtures thereof, and
      (C) compounds selected from the group consisting of blocked polyisocyanates and mixtures thereof, wherein the isocyanate(s) is blocked with a blocking agent I, selected from the group consisting of dialkyl malonates and mixtures thereof and a blocking agent II, which is different from I and is selected from the group consisting of compounds containing active methylene groups, an oxime and mixtures thereof and the ratio of equivalents between the isocyanate groups blocked with (I) and the isocyanate groups blocked with (II) being between 1.0:1.0 and 9.0:1.0, and subsequently
   (4) baking together the basecoat layer and topcoat layer.
2. Process according to claim 1, characterized in that the ratio of equivalents between the isocyanate groups blocked with (I) and those blocked with (II) is between 8.0:2.0 and 6.0:4.0.
3. Process according to claim 1, characterized in that component (A) has a hydroxyl number of from 40 to 240, and is present in an amount of from 50 to 90% by weight, and component (B) is present in an amount of from 5 to 45% by weight, and component (C) is present in an amount of from 5 to 45% by weight, the percentages by weight being based on (A)+(B)+(C)=100% by weight.
4. Process according to claim 1, characterized in that the blocked isocyanate groups contained in component (C) are attached to aliphatic or cycloaliphatic radicals.
5. Process according to claim 1, characterized in that component (C) comprises an isocyanate selected from the group consisting of blocked hexamethylene diisocyanate, blocked isophorone diisocyanate and mixtures thereof.
6. Process according to claim 1, characterized in that the blocking agent (I) is diethyl malonate.
7. Process according to claim 1, characterized in that the blocking agent (II) contains active methylene groups is selected from the group consisting of alkyl acetoacetates having 1 to 6 carbon atoms in the alkyl moiety and mixtures thereof.
8. Process according to claim 1, characterized in that the blocking agent (II) is methyl ethyl ketoxime.
9. Transparent topcoat composition of a two-coat finish including a basecoat and a transparent topcoat composition comprising
   (A) a resin selected from the group consisting of synthetic resins containing hydroxyl groups and mixtures thereof,
   (B) a resin selected from the group consisting of amino resins and mixtures thereof, and
   (C) a compound selected from the group consisting of blocked polyisocyanates and mixtures thereof
   wherein the isocyanate(s) is blocked with a blocking agent I, selected from the group consisting of dialkyl malonates and mixtures thereof and a blocking agent II, which is different from I and is selected from the group consisting of compounds containing active methylene groups, an oxime and mixtures thereof and the ratio of equivalents between the isocyanate groups blocked with (I) and the isocyanate groups blocked with (II) being between 1.0:1.0 and 9.0:1.0.
10. Composition according to claim 9, characterized in that the ratio of equivalents between the isocyanate groups blocked with (I) and those blocked with (II) is between 7.5:2.5 and 6.5:3.5.
11. Composition according to claim 9, characterized in that component (A) has a hydroxyl number of from 40 to 240, and is present in an amount of from 50 to 90% by weight, and component (B) is present in an amount of from 5 to 45% by weight, and component (C) is present in an amount of from 5 to 45% by weight, the percentages by weight being based on (A)+(B)+(C)=100% by weight.
12. Composition according to claim 9, characterized in that the blocked isocyanate groups contained in component (C) are attached to aliphatic or cycloaliphatic radicals.
13. Composition according to claim 9, characterized in that component (C) comprises an isocyanate selected from the group consisting of blocked hexamethylene diisocyanate, blocked isophorone diisocyanate and mixtures thereof.
14. Composition according to claim 9, characterized in that the blocking agent (I) is diethyl malonate.
15. Composition composition according to claim 9, characterized in that the blocking agent (II) contains active methylene groups and is selected from the group consisting of alkyl acetoacetates having 1 to 6 carbon atoms in the alkyl moiety and mixtures thereof.
16. Composition according to claim 9, characterized in that the blocking agent (II) is methyl ethyl ketoxime.
17. Composition according to claim 9, characterized in that the ratio of equivalents between the isocyanate groups blocked with (I) and those blocked with (II) is between 8.0:2.0 and 6.0:4.0.
18. Composition according to claim 9, characterized in that component (A) has a hydroxyl number of from 60 to 150 and is present in an amount of from 60 to 75% by weight, and component (B) is present in an amount of from 10 to 25% by weight, and component (C) is present in an amount of from preferably 10 to 25% by weight, the percentages by weight being based on (A)+(B)+(C)=100% by weight.
19. Composition according to claim 9, characterized in that the blocking agent (II) is ethyl acetoacetate.

* * * * *